United States Patent
Mayinger (10) Patent No.: US 11,685,064 B2
(45) Date of Patent: Jun. 27, 2023

(54) TACTILE AND/OR OPTICAL DISTANCE SENSOR, SYSTEM HAVING SUCH A DISTANCE SENSOR, AND METHOD FOR CALIBRATING SUCH A DISTANCE SENSOR OR SUCH A SYSTEM

(71) Applicant: Carl Zeiss Industrielle Messtechnik GmbH, Oberkochen (DE)

(72) Inventor: Philipp Mayinger, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 263 days.

(21) Appl. No.: 17/214,559

(22) Filed: Mar. 26, 2021

(65) Prior Publication Data
US 2021/0299891 A1    Sep. 30, 2021

(30) Foreign Application Priority Data

Mar. 26, 2020  (DE) ..................... 10 2020 108 406.4

(51) Int. Cl.
*G01B 11/30*    (2006.01)
*B25J 19/02*    (2006.01)
(Continued)

(52) U.S. Cl.
CPC ........... *B25J 19/025* (2013.01); *B25J 9/1692* (2013.01); *G01B 11/005* (2013.01); *G01L 1/246* (2013.01)

(58) Field of Classification Search
CPC ............ G01B 5/28; G01B 11/30; G01L 1/246
(Continued)

(56) References Cited

U.S. PATENT DOCUMENTS

| 4,333,238 A | 6/1982 | McMurtry | |
| 4,777,011 A * | 10/1988 | Scharpenberg | ........ G21C 17/06 |
| | | | 73/104 |

(Continued)

FOREIGN PATENT DOCUMENTS

| DE | 3011003 A1 | 10/1980 |
| DE | 102010052503 A1 | 5/2012 |
| DE | 102017103954 A1 | 8/2018 |

OTHER PUBLICATIONS

Office Action issued in German Patent Application No. DE 10 2020 108 406.4, dated Nov. 10, 2020 (from which this application claims priority) and English language translation thereof.

*Primary Examiner* — George B Bennett
(74) *Attorney, Agent, or Firm* — Ewers IP Law PLLC; Falk Ewers (57) ABSTRACT

A tactile and/or optical distance sensor includes a housing, which has at least one elongate portion, a measurement arm, which is arranged in the housing, at least partially extends through the elongate portion and has a tactile and/or an optical probe element at one end, a transducer, which is configured to capture a position of the tactile probe element or a signal of the optical probe element and to generate associated probe element measurement signals, and an advance unit, with which the housing is linearly dis-placeable along an advance direction. A strain sensor is located in the region of the measurement arm extending through the elongate portion or at an adjacent region directly adjoining said region. In addition, a system for measuring the roughness of a surface of a workpiece and a method for calibrating a distance sensor or a system are provided.

13 Claims, 5 Drawing Sheets

(51) Int. Cl.
    *B25J 9/16*     (2006.01)
    *G01L 1/24*     (2006.01)
    *G01B 11/00*     (2006.01)

(58) Field of Classification Search
    USPC .......................................................... 33/533
    See application file for complete search history.

(56) References Cited

U.S. PATENT DOCUMENTS

| | | | |
|---|---|---|---|
| 9,091,521 B2* | 7/2015 | Nakayama | G01B 7/34 |
| 9,285,201 B2* | 3/2016 | Matsumiya | G01B 7/28 |
| 9,291,442 B2* | 3/2016 | Hidaka | G01B 21/30 |
| 9,933,277 B2* | 4/2018 | Terauchi | G01B 5/28 |
| 10,018,523 B2* | 7/2018 | Wang | G01D 5/35316 |
| 11,022,418 B2* | 6/2021 | Kanematsu | G01B 5/0004 |
| 11,085,752 B2* | 8/2021 | Nakayama | G01B 5/20 |
| 11,435,174 B2* | 9/2022 | Rudkowski | G01B 5/0004 |
| 2020/0200519 A1* | 6/2020 | Leber | G01B 5/20 |
| 2022/0018653 A1* | 1/2022 | Carlu | G01B 11/24 |
| 2022/0032455 A1* | 2/2022 | Gomi | G01N 21/17 |
| 2022/0099436 A1* | 3/2022 | Chen | G01B 9/02097 |
| 2022/0314292 A1* | 10/2022 | Argellati | G01L 1/246 |

* cited by examiner

TACTILE AND/OR OPTICAL DISTANCE SENSOR, SYSTEM HAVING SUCH A DISTANCE SENSOR, AND METHOD FOR CALIBRATING SUCH A DISTANCE SENSOR OR SUCH A SYSTEM

CROSS REFERENCE TO RELATED APPLICATIONS

This application claims priority to German patent application DE 10 2020 108 406.4, filed Mar. 26, 2020, the entire content of which is incorporated herein by reference.

TECHNICAL FIELD

The disclosure relates to a tactile distance sensor, as is typically attached to a coordinate measuring machine or to a robot. Such distance sensors are used for example to measure the surface quality of high-quality workpieces such as engine blocks. The disclosure additionally relates to a system having such a distance sensor and to a method for calibrating such a distance sensor or such a system having such a distance sensor.

BACKGROUND

Tactile and/or optical distance sensors, which are usually embedded in systems such as coordinate measuring machines, are used for measuring the roughness of workpiece surfaces or for measuring the geometry thereof. Such coordinate measuring machines usually comprise a table carrying the workpiece to be measured and a positioning device allowing the distance sensor to be displaced with high accuracy in three orthogonal displacement directions X, Y, and Z relative to the table. Coordinate measuring machines having a displaceable table that moves relative to the stationary measurement apparatus are also known.

Furthermore, coordinate measuring machines have an evaluation and control device which controls the movements of the positioning device and evaluates the measurement values supplied by the distance sensor.

The distance sensor can be, for example, what is known as a stylus instrument. The latter generally has a movably mounted measurement arm, at the end of which a probe element, e.g., a diamond needle, is attached. The probe element is deflected during the measurement owing to the contact with the workpiece surface and is displaced for this purpose along an advance direction perpendicular to the deflection direction using a linear drive. In this way, the workpiece surface to be measured can be probed.

In recent years, the field of application of such measuring apparatuses has increasingly expanded. Workpieces often have to be manufactured with such small tolerances in modern production processes that continuous process monitoring is necessary.

A problem that arises frequently in that case is that the workpieces whose surfaces are intended to be measured in an automated fashion have a very complex design. Accordingly, the surfaces to be measured are often located at sites that are difficult to access. As a result, modern measurement apparatuses for coordinate measuring machines often have a movable arm with a comparatively thin construction, said arm carrying the distance sensor. The arm can move a distance sensor with a correspondingly narrow and long construction into practically any desired pose relative to the workpiece by a plurality of rotational degrees of freedom.

This construction then entails different problems again. The longer and narrower the arm at which a distance sensor is held is and/or the longer and narrower the distance sensor itself is, the more noticeable are static or dynamic deformations of the arm and/or of the distance sensor during the measurement process. This results in a larger sensitivity with respect to probing contact force fluctuations and ground vibrations. Owing to such force fluctuations, parts within the measurement circle may, under certain circumstances, bend both in skid-based systems and in systems without a skid, which can in turn be recorded as measurement errors. The same problems arise if the aim is to reduce the sensitivity for the same installation space and thus to create a measurement system that is suitable for systems with little damping, such as robot arms, or in an environment in which increasingly vibrations occur—such as in a manufacturing environment.

SUMMARY

It is an object of the disclosure to provide an optical or tactile distance sensor that makes possible a long and narrow construction and, associated therewith, excellent access to measurement sites and at the same time offers a higher tolerance with respect to natural vibrations or bending.

This object is achieved by a tactile and/or optical distance sensor, having a housing, which has at least one elongate portion, a measurement arm, which is arranged in the housing, at least partially extends through the elongate portion and has a tactile and/or an optical probe element at one end, a transducer, which is configured to capture a position of the tactile probe element or a signal of the optical probe element and to generate associated probe element measurement signals, and an advance unit, with which the housing is linearly displaceable along an advance direction.

According to an aspect of the disclosure, a strain sensor is located in the region of the measurement arm extending through the elongate portion or at an adjacent region directly adjoining said region, the strain sensor having a fiber Bragg grating. Such a strain sensor can be used to capture a potentially occurring deformation or bending of the elongate portion and the measurement result of the distance sensor or of the measurement arm may be corrected taking into account the measurement value of the strain sensor.

Provision may be made here for example for a geometric correction of the length of the elongate portion or of the regions associated with the elongate portion to be performed.

This makes it possible to produce the distance sensor or measurement arm with a smaller diameter and/or a smaller wall thickness for better access at the surface to be measured, without negatively affecting the measurement accuracy. In the reverse, it is possible to increase the measurement accuracy in an already present distance sensor or measurement arm design.

The use of a strain sensor additionally offers the advantage that it can be mounted where a bending of a component takes place that is relevant for the measurement result. Other deformations that have no effect on the measurement result can thus be disregarded.

The strain sensor is a fiber Bragg grating. Components that are already present, such as light source or spectral analyzers, can under certain circumstances be advantageously used for the optical probe element.

The strain sensor is advantageously mounted at a site having a high local strain. This makes capturing particularly relevant bending events and a corresponding correction of the probe element deflection values of the probe element possible, as has already been indicated.

According to an exemplary embodiment of the disclosure, the strain sensor may be integrated in the housing. This makes particularly simple capturing of any occurring bending moments within the housing possible.

In a distance sensor having at least one supporting element, the supporting element is typically located at the elongate portion. This exemplary embodiment is advantageous in particular if a probing contact is to be detected with the strain sensor.

The object is also achieved by a system for measuring the roughness of a surface of a workpiece, having a coordinate measuring machine with a positioning device, a distance sensor as described above, a measurement head, which is mounted between the positioning unit and the distance sensor and is configured to exert actuating forces in all directions and to measure forces acting on the measurement head in all directions and/or deflections, and a control device for controlling the system.

In an exemplary embodiment of the system, the control device is configured to receive strain sensor values from the strain sensor, to receive probe element deflection values from the probe element, and to correlate the strain sensor values and the deflection values. "Correlate" in this case is understood to mean to establish a relationship between the strain sensor values and the deflection values in a manner such that the probe element deflection values are correctable with the aid of the strain sensor values. For this purpose, a strain sensor value can be assigned to a specific probe element deflection value, for example, by both being recorded at the same recording time point—or by the recording having taken place during a measurement process at the same site. Furthermore, in the case of a tactile probe element, a specific contact pressure force of the probe element acting on the surface to be measured can be assigned to a specific strain sensor value and a specific geometric change of the probe element can be ascertained. Even in the case of an optical probe element, it is possible to deduce from a specific strain sensor value a specific geometric change of the probe element, which can again be used for correcting the probe element deflection value.

In a development of the disclosure, the control device is configured to detect probing contact based on a strain sensor value of the strain sensor. This improves the reliability of the system and helps in preventing damage to the system or to the surface to be inspected.

In an exemplary embodiment of the disclosure, the system has an optical distance sensor with an associated light source—for example a white light source and/or a laser—and a spectrometer. According to an aspect of the disclosure, the light source and/or the spectrometer may also be used as a light source and/or spectrometer for the strain sensor. This reduces the apparatus required for the additional strain sensor of the system significantly and makes a particularly cost-effective embodiment possible.

In a development of the disclosure, the system has a beam splitter and/or an optical multiplexer. A beam splitter or an optical multiplexer can be used to couple the light out of the light source into the strain sensor and/or out of the latter.

The object is also achieved by a method for calibrating a distance sensor as described above or for calibrating a system as described above, wherein the method includes the steps of: causing the distance sensor to make probing contact with a surface, capturing a strain sensor value of the strain sensor, a probe element deflection value of the probe element and/or a contact pressure force value, and performing the steps of making probing contact and capturing for a plurality of contact pressure force values.

The surface can be a surface that is to be inspected. However, a different surface that is suitable for a mechanical or optical contact with the probe element can also be used for making probing contact.

The steps of making probing contact and capturing the mentioned values can be performed for at least two and, better, for a larger number of values.

During the capturing, at least the two-values strain sensor value and probe element deflection value can be captured. A correlation of these two values already allows an improvement of the accuracy of the deflection values captured. If the contact pressure force exerted on the probe element and/or the overall deflection of the distance sensor is/are additionally ascertained, the variable ascertained as the probe element deflection can be corrected even better.

A development of the method comprises the step of creating a lookup table and/or a functional relationship for probe element deflection values, strain sensor values, overall deflection and/or contact pressure force values. This allows improved correction of the deflection value taking into account the strain sensor values, the overall deflection and/or the contact pressure force values. In particular, static tools, physical and/or other mathematical models can be used for the correction.

An exemplary embodiment of the method includes the step of ascertaining a correction value for the probe element deflection value on the basis of the strain sensor value using the lookup table and/or the functional relationship.

According to an exemplary embodiment of the disclosure, a temporal correlation of the making probing contact and of the capturing of the strain sensor value of the strain sensor, of the probe element deflection value of the probe element, of the overall deflection and/or of the contact pressure force value is captured. This allows particularly accurate assignment of the captured values and thus allows a particularly high accuracy of the correction.

BRIEF DESCRIPTION OF THE DRAWINGS

The disclosure will now be described with reference to the drawings wherein.

DESCRIPTION OF EXEMPLARY EMBODIMENTS

Figure 1:
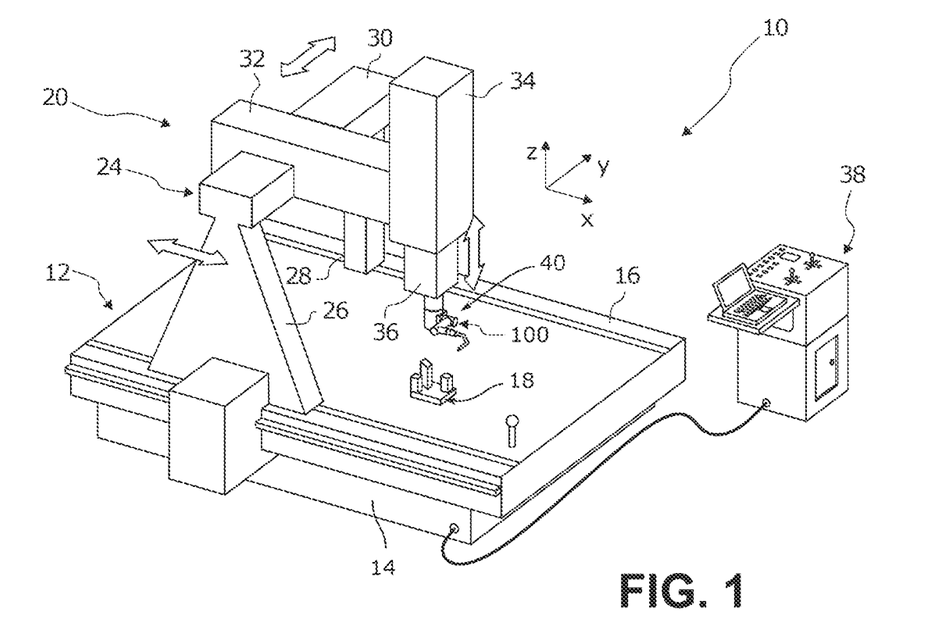
FIG. 1 shows a perspective illustration of a coordinate measuring machine having, attached thereto, a distance sensor according to an exemplary embodiment of the disclosure.

FIG. 1 shows a schematic perspective illustration of a coordinate measuring machine 10. The coordinate measuring machine 10 includes a table 12 including a base 14 and a plate 16 made of hard rock. The plate 16 serves to receive a workpiece 18, the surface of which is intended to be measured. In the illustrated exemplary embodiment, the measurement is a spatially resolved roughness measurement.

The table 12 carries a positioning device 20, with which a distance sensor 100 according to the disclosure can be positioned relative to the table 12 with high accuracy. In the exemplary embodiment illustrated, the positioning device 20 has a gantry-type configuration and includes a gantry 24, which is mounted with two feet 26, 28 at the peripheries of the table 12 and is displaceable along the table 12 in the horizontally extending X-direction in a motor-driven manner. A cantilever 32 is mounted on a gantry crossbeam 30, which interconnects the two feet 26, 28, in such a way that said cantilever can be displaced in a motor-driven manner along the longitudinal direction of the gantry crossbeam 30, i.e., in the likewise horizontally extending Y-direction. A measurement carrier 36 is received in a vertically aligned receptacle 34 of the cantilever 32 and is displaceable in a motor-driven manner along the vertically extending Z-direction. The displaceability is in each case indicated by a double-headed arrow.

With the aid of an automatic coupling, the distance sensor 100 according to an aspect of the disclosure is attached to the measurement carrier 36 in such a way that it can be automatically interchanged with a distance sensor having a different construction. To this end, the positioning device 20 usually places the distance sensor 100 in a retainer (not shown) at the periphery of the table 12 and then approaches another distance sensor, held in the retainer, in such a way that the automatic coupling is activated. In addition to a purely mechanical connection, the automatic coupling can also establish a communication link so that control and measurement data can be exchanged between the distance sensor 101 and a control and evaluation device 38. As an alternative, such communication may also be effected by way of a radio interface.

The space that can be achieved by the measurement carrier 36 as a result of displacement movements along the X-, Y-, and Z-axes is of the order of approximately 2 m$^3$ in the illustrated exemplary embodiment, and thus even significantly larger workpieces 18 can be measured than what is illustrated in FIG. 1.

For each of the three displacement directions X, Y, and Z, the positioning device 20 has at least one transducer, which returns information relating to the travels covered to the evaluation and control device 38. As a result, the position of the automatic coupling, which has the distance sensor 100 attached thereto and which substantially corresponds to the tool center point (TCP) in the case of robots, is known with a high accuracy in all displacement positions.

The evaluation and control device 38 controls the movements of the positioning device 20 and evaluates the measurement values transferred from the distance sensor 100. The evaluation also includes the computational correction of the measurement values supplied by the distance sensor 100. As a result, it is possible to take account of static and dynamic influences of the positioning device 20, thermal deformations of the table 12, and also the bend of tactile probes caused by contact forces.

The construction of the roughness probe 100 according to an aspect of the disclosure will be explained in more detail below with reference to FIG. 2.

Figure 2:
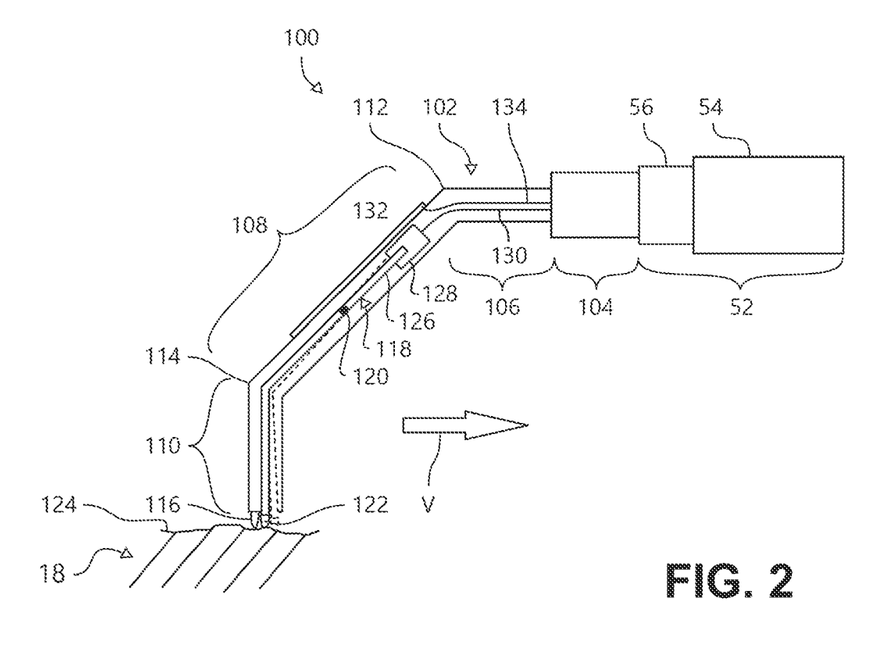
FIG. 2 shows a schematic sectional illustration of a distance sensor according to a first exemplary embodiment of the disclosure.

FIG. 2 shows the distance sensor 100 in a schematic, partially sectioned side view.

The distance sensor 100 has a housing 102, which can be subdivided into a connection portion 104, an intermediate portion 106, an angled portion 108, and a vertical portion 110. The connection portion 104 extends with its longitudinal axis along the advance direction V, along which the distance sensor 100 is moved during operation. The connection portion 104 attaches the distance sensor 100 to a displaceable attachment element 56 of an advance unit 52. The advance unit 52 not only has the attachment element 56 but also a drive unit 54 and is part of an arm 40. The arm 40 serves for positioning the distance sensor 100 in a specific pose at a specific site of the workpiece 18 to be measured.

The intermediate portion 106 of the housing 102, which connects to the connection portion 104, likewise extends with its longitudinal axis along the advance direction V but has a smaller diameter than the connection portion 104. The intermediate portion 106 transitions into the angled portion 108 at a kinked site 112. The longitudinal axis of the angled portion 108 extends in the exemplary embodiment shown in FIG. 2 along a longitudinal axis, which encloses an angle of 45° with the vertical longitudinal axis of the intermediate portion 106. The angled portion 108 transitions into the vertical portion 110 at a second kinked site 114. Consequently, the vertical portion 110 is aligned perpendicularly to the advance direction V. A supporting element 116 is mounted at the end of the vertical portion 110 facing the object 18 to be inspected, or facing the surface thereof. The supporting element 116 is fixedly connected to the housing 102 and rests against the workpiece 18 during measurements and prevents the actual probe element from performing oscillations during the measurements.

The housing 102 has, in the interior, a measurement arm 118, which is mounted rotatably about an axis of rotation 120. At its end facing the workpiece 18, the measurement arm 118 carries a probe element 122, which may be, for example, a diamond needle. When the probe element 122 is deflected by the surface 124 of the workpiece 18, the opposite end 126 of the measurement arm 118 swings out. This swing is captured by a transducer in the form of a measurement system 128. The measurement system 128 generates, in dependence on the rotational position of the measurement arm 118, measurement signals that represent the rotational positions and thus the deflection of the probe element 122. The measurement system 128 can register the rotational position of the measurement arm 118 by inductive, optical, magnetic or even pneumatic means. In the present exemplary embodiment, the measurement signals generated by the measurement system 128 are transmitted in the form of probe element deflection values for further processing via a line 130 to the connection portion 104 and finally to the control and evaluation device 38.

During a measurement, the distance sensor 100 is displaced along the advance direction V with the aid of the advance unit 52. The roughness of the surface 124 can be ascertained based on a time-dependent and/or location-dependent capturing of the deflections of the probe element 116.

Despite the two angled portions of the housing 102 shown in FIG. 2, the housing 102 can experience a bending moment during a measurement and/or while probing contact is made and can correspondingly deform elastically. In order to detect such a deformation and take it into account in the evaluation of the probe element deflection value, the distance sensor 100 shown in FIG. 2 has a strain sensor 132. The latter is mounted for example in the exemplary embodiment shown in FIG. 2 on the angled portion 108. This attachment location is merely exemplary, however. The strain sensor 132 can be mounted wherever expected critical bending moments occur. In a skid-less system—as is shown in FIG. 2—both the transition between the supporting element and the needle for the suspension of the measurement system and between the suspension of the measurement system and the change interface or the advance are critical. One or more strain sensors 132 can be mounted at all these sites. In the present exemplary embodiment shown in FIG. 2, this would therefore in principle be along the entire housing 102 including the connection portion 104, possibly also in the region of the attachment element 56.

The strain sensor 132 is mounted on the outside of the housing 102, as is shown in FIG. 2. However, this should likewise be understood to be merely exemplary. The strain sensor 132 could also be integrated in the interior region of the housing 102 or even in the housing wall of the housing 102 itself.

The strain sensor 132 is connected via a line 134— comparable to the line 130—to the connection portion 104.

If the distance sensor 100 is displaced along the advance direction V and, as a result, the support element 116 glides over the surface 124 of the workpiece 18, the forces that are transmitted onto the housing 102 are picked up by the advance unit 52 and the distance sensor 100 is adjusted accordingly. Nevertheless, bending moments on parts of the housing 102, on the entire housing 102 relative to the connection portion 104 and/or at the transition to the attachment element 56 can occur owing to the forces that are occurring. Said bending moments can be captured via the strain sensor 132, provided it is mounted at the corresponding site, and be transmitted via the line 134 via an electrical interface to the control and evaluation device 38 for further processing. The control and evaluation device 38 can then correct—possibly in knowledge of the contact pressure force values and the over-all deflection—the probe element deflection values on the basis of the strain sensor values.

The strain sensor 132 can be embodied with a suitable technology, depending on the construction and design of the distance sensor 100. For example, the strain sensor can be an electrical strain gage or be based on optical technology, for example a fiber Bragg grating.

Figure 3:
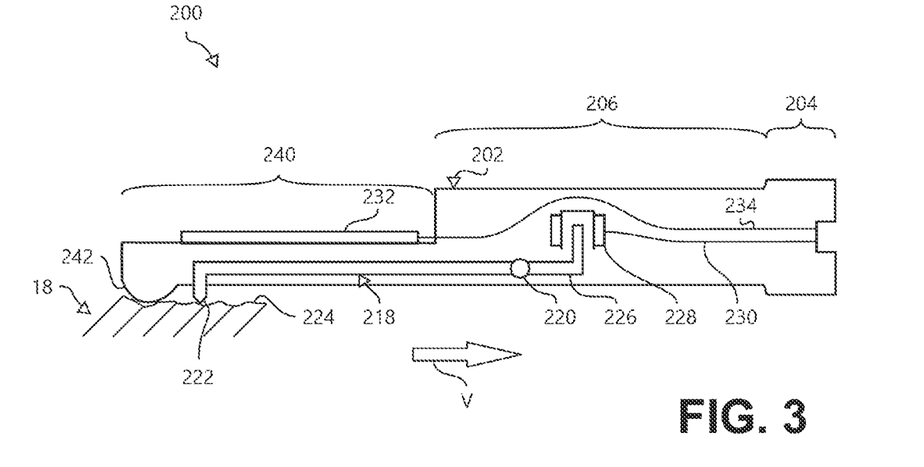
FIG. 3 shows a schematic sectional illustration of a distance sensor according to a second exemplary embodiment the disclosure.

FIG. 3 illustrates in a schematic sectional view an alternative exemplary embodiment of a distance sensor 200. Identical or comparable features are given the same reference signs—to which 100 has been added—as were used in FIG. 2.

While the exemplary embodiment of FIG. 2 shows a distance sensor 100 operating without a skid but merely with a supporting element 116, FIG. 3 shows a distance sensor 200 that operates on a skid-basis. Accordingly, the housing 202 of the distance sensor 200 likewise has a connection portion 204, which transitions into an intermediate portion 206. In contrast to the distance sensor 100, the distance sensor 200 of FIG. 3 has, connected thereto, a straight portion 240, which has a skid 242 at its end facing the object 18 to be inspected, or facing the surface 224 thereof that is to be inspected.

While the skid 242 glides over the surface 224 of the workpiece 18 when the distance sensor 200 is moved along the advance direction, the measurement arm 218 moves owing to the contact of the probe tip 222 with the surface 224. In the process, the measurement arm 218 rotates about its axis of rotation 220. This movement is captured in the measurement system 228 and is transmitted via an electrical line 230 to the control and evaluation device 38 for further processing. The distance sensor 200 likewise has in the straight portion 240 at the housing 202 a strain sensor 232, which can transmit the generated strain sensor values to the control and evaluation device 38 with a line 234. Here, too, arranging the strain sensor 232 at a site that experiences particularly high bending moments is an example. The arrangement in this case can be realized outside of the housing 202, integrated in the housing wall, or inside the housing 202.

In FIGS. 2 and 3, strain sensors 132, 232 are illustrated by way of example. They can be both of an electrical and an optical type. The probing techniques illustrated are mechanical, that is to say tactile, in FIGS. 2 and 3. Alternatively, the probe elements 118, 218 can also operate on an optical basis.

Figure 4:
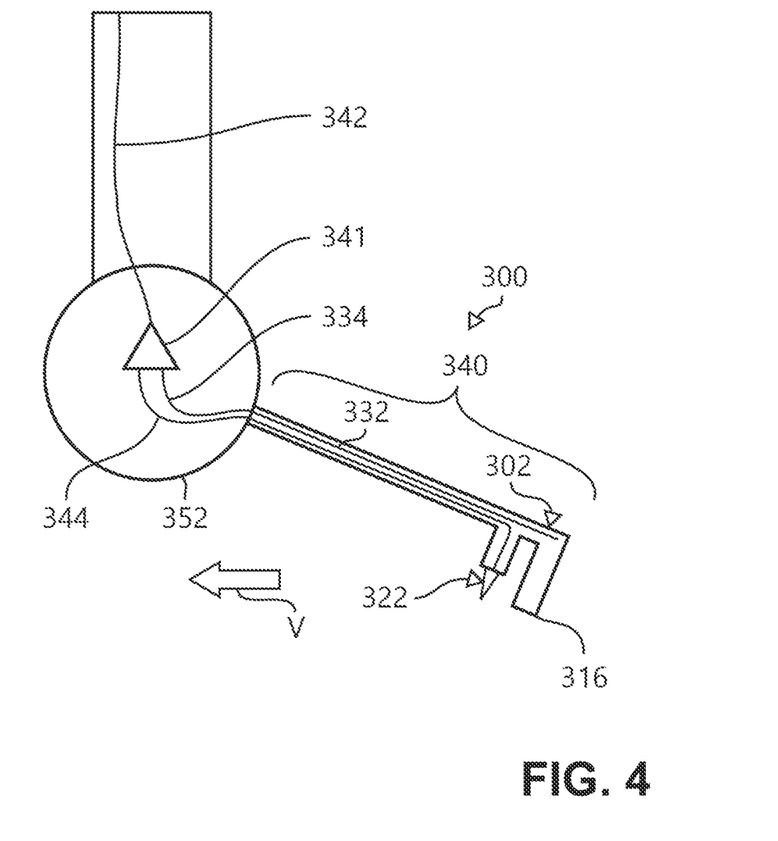
FIG. 4 shows a schematic sectional illustration of a distance sensor according to a third exemplary embodiment the disclosure.

FIG. 4 shows a schematic cross-sectional illustration of a third exemplary embodiment of a distance sensor 300. Identical or comparable features are given the same reference signs, to which 100 has been added.

The distance sensor 300 likewise has a housing 302, which has a supporting element 316 at its end facing the object to be inspected. The supporting element 316 can also be embodied in the form of a skid. The housing 302 is displaceable along an advance direction V with an advance unit 352.

A fiber Bragg grating is arranged as the strain sensor 332 in the interior of the housing 302 in the elongate portion 340. The fiber Bragg grating is connected to an optical splitter 341 using a fiber cable 334. The optical splitter 341 or optical multiplexer has a supply line 342 in the form of an optical waveguide. The fiber Bragg grating 332 can be supplied by the corresponding light source via said supplying optical waveguide 342.

At the same time, the probe element 322 in this exemplary embodiment is an optical distance sensor. The latter likewise has an optical line 344 leading to the optical multiplexer 340. In this way, the probe element 322 can likewise be supplied by the required light source, and the optical signals can be guided both from the optical distance sensor 322 and from the fiber Bragg grating 332, which acts as the strain sensor, via the optical multiplexer 340 and the waveguide 342 to the control and evaluation device 38. There, the light source and also a spectrometer (not shown) can input the corresponding signals into the optical waveguide 342 and read them therefrom. This exemplary embodiment has the major advantage that the devices which are already present for the optical distance sensor, such as light source and spectrometer, can also be used for capturing the strain via the strain sensor 332 in the form of a fiber Bragg grating.

Figure 5:
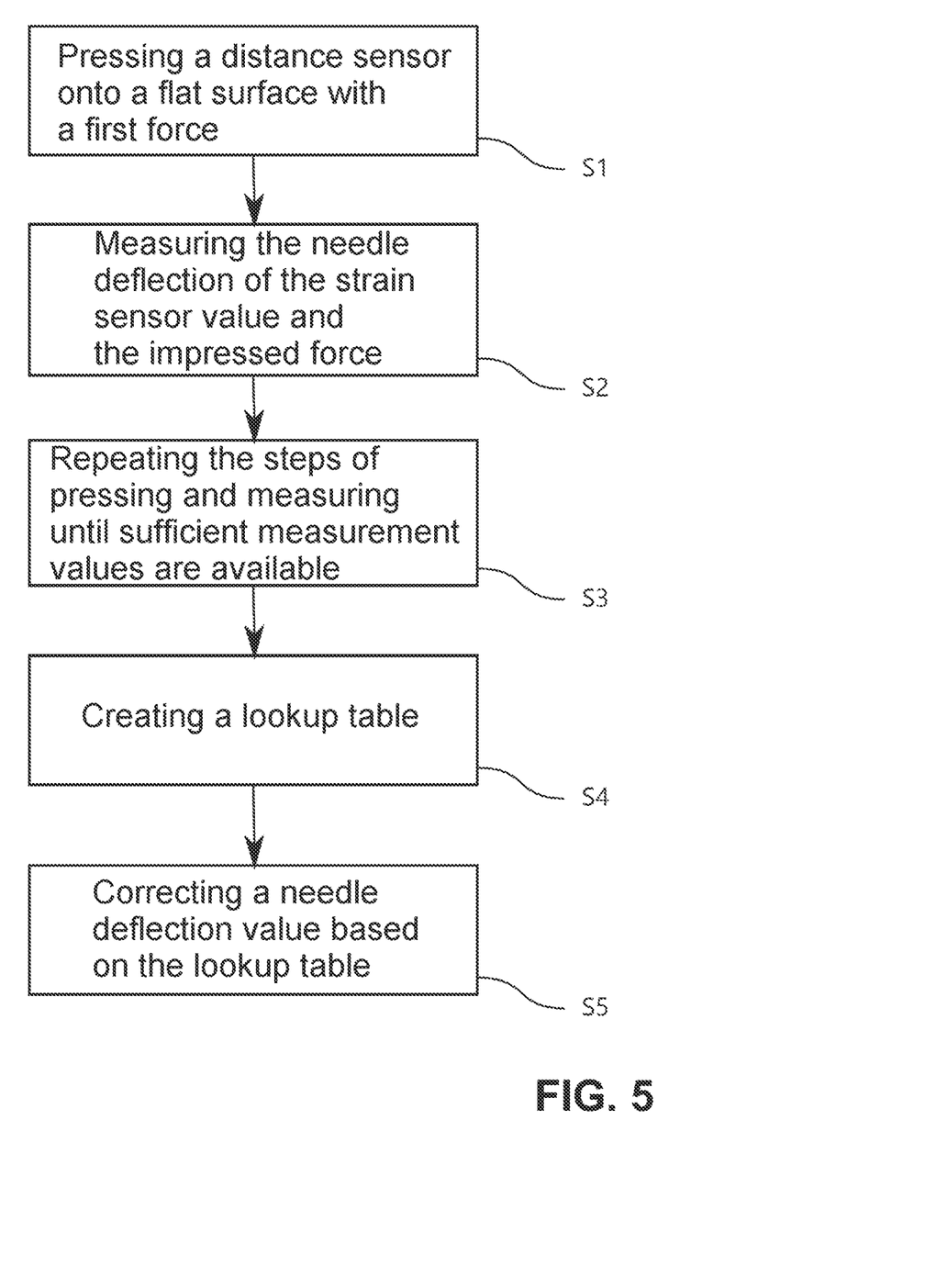
FIG. 5 shows a method for calibrating a distance sensor or a system.

FIG. 5 illustrates a method for calibrating a distance sensor as described above or for calibrating a system as described above.

In a first step S1, a distance sensor is pressed onto a flat surface with a first force. The flat surface is, for example, a glass or a ceramic plate. This step is called making probing contact.

In a second step S2, the deflection of the probe element such as a needle or an optical distance sensor, the strain sensor value of a strain sensor, and the force impressed on the probe element are measured.

Steps S1 and S2 are repeated with different force values until a sufficient number of measurement values has been ascertained S3.

A lookup table is created S4 from the measurement values thus ascertained.

For correcting a measurement value of a needle deflection, recorded during a measurement, it is possible to consult the lookup table. Non-captured needle deflection values can be interpolated from the available support sites.

A table of this type can, for example, look as follows:

| Force | Overall deflection | Strain value | Deflection |
|---|---|---|---|
| 100 mN | 3 μm | 150 nm | 800 nm |
| 200 mN | 5 μm | 230 nm | 1300 nm |
| 300 mN | 10 μm | 270 nm | 1700 nm |

In the case of a value for the strain value of 230 nm that is measured later, for example the overall deflection of the needle can be corrected by 5 μm to an actual needle deflection of 1.3 μm.

It is understood that the foregoing description is that of the exemplary embodiments of the disclosure and that various changes and modifications may be made thereto without departing from the spirit and scope of the disclosure as defined in the appended claims.

What is claimed is:

1. A tactile and/or optical distance sensor comprising:
   a housing having at least one elongate portion;
   a measurement arm arranged in the housing, at least partially extending through the at least one elongate portion, and having at one end a tactile and/or optical probe element;
   a transducer configured to capture a position of the tactile probe element or a signal of the optical probe element and to generate associated probe element measurement signals; and
   an advance unit, with which the housing is linearly displaceable along an advance direction, and
   wherein a strain sensor is located in a region of the measurement arm extending through the at least one elongate portion or at an adjacent region directly adjoining said region, and wherein the strain sensor has a fiber Bragg grating.

2. The tactile and/or optical distance sensor according to claim 1, wherein the strain sensor is mounted at a site with a high local strain.

3. The tactile and/or optical distance sensor according to claim 1, wherein the strain sensor is integrated in the housing.

4. The tactile and/or optical distance sensor according to claim 1, further comprising at least one supporting element, wherein the at least one supporting element is located at the at least one elongate portion.

5. A system for measuring a roughness of a surface of a workpiece, the system comprising:
   a coordinate measuring machine including a positioning device;
   the tactile and/or optical distance sensor according to claim 1;
   a measurement head mounted between the positioning device and the optical distance sensor and configured to exert actuating forces in all directions and to measure forces acting on the measurement head in all directions and/or deflections; and
   a control device for controlling the system.

6. The system according to claim 5, wherein the control device is configured to:
   receive strain sensor values from the strain sensor;
   receive probe element deflection values from the probe element; and
   correlate the strain sensor values and the deflection values.

7. The system according to claim 5, wherein the control device is configured to detect probing contact based on a strain sensor value of the strain sensor.

8. The system according to claim 5, further comprising:
   the optical distance sensor and an associated light source, and
   a spectrometer, and
   wherein the associated light source and/or the spectrometer are also usable for the strain sensor.

9. The system according to claim 8, wherein the system further comprises a beam splitter or an optical multiplexer.

10. A method for calibrating a system according to claim 5, comprising:
    causing the optical distance sensor to make probing contact with the surface;
    capturing at least one of a strain sensor value of the strain sensor, a probe element deflection value of a probe element, an overall deflection, and a contact pressure force value; and
    performing the steps of making the probing contact and capturing for a plurality of contact pressure force values.

11. The method according to claim 10, further comprising creating at least one of a lookup table, a functional relationship for contact pressure force values, probe element deflection values, the overall deflection, and strain sensor values.

12. Method according to claim 11, further comprising ascertaining a correction value for the probe element deflection value based on at least one of the strain sensor value using the lookup table, and the functional relationship.

13. The method according to claim 10, further comprising capturing at least one of a temporal correlation of the making the probing contact and of the capturing of the strain sensor value of the strain sensor, of the probe element deflection value of the probe element, of the overall deflection and of the contact pressure force value.

* * * * *